United States Patent [19]
Nowicke, Jr.

[11] Patent Number: 5,909,729
[45] Date of Patent: Jun. 8, 1999

[54] SMOKER ADAPTER FOR BARBECUE GRILLS

[76] Inventor: Frank L. Nowicke, Jr., 19358 Ossenfort Ct., Glencoe, Mo. 63038

[21] Appl. No.: 08/856,737

[22] Filed: May 15, 1997

[51] Int. Cl.[6] .................................................. A47J 37/00
[52] U.S. Cl. ......................... 126/25 R; 126/9 R; 99/482
[58] Field of Search .................... 126/25 R, 9 R, 126/9 A, 9 B, 25 B, 41 R; 99/340, 444, 482, 339

[56] References Cited

U.S. PATENT DOCUMENTS

| | | | |
|---|---|---|---|
| 3,359,963 | 12/1967 | Kotial | 126/9 R |
| 3,776,127 | 12/1973 | Muse | 99/482 |
| 3,851,639 | 12/1974 | Beddoe . | |
| 3,880,139 | 4/1975 | Young | 126/9 R |
| 4,094,295 | 6/1978 | Boswell . | |
| 4,140,049 | 2/1979 | Stewart . | |
| 4,334,462 | 6/1982 | Hefling . | |
| 4,495,860 | 1/1985 | Hitch | 129/9 R |
| 4,512,249 | 4/1985 | Mentzel . | |
| 4,535,749 | 8/1985 | Schlosser et al. . | |

*Primary Examiner*—James C. Yeung
*Attorney, Agent, or Firm*—Polster, Lieder, Woodruff & Lucchesi, L.C.

[57] ABSTRACT

A barbecue grill provided with an adapter sleeve to convert the grill to food smoker apparatus having a cylindrical sleeve equipped with handles and means to support the food grill and a water containing pan. The support means provide fixed or removable supports for incorporating a water pan in the sleeve beneath the food grill. The smoker apparatus in the sleeve being configured for easy cleaning either in place in the sleeve or removed from the sleeve.

1 Claim, 2 Drawing Sheets

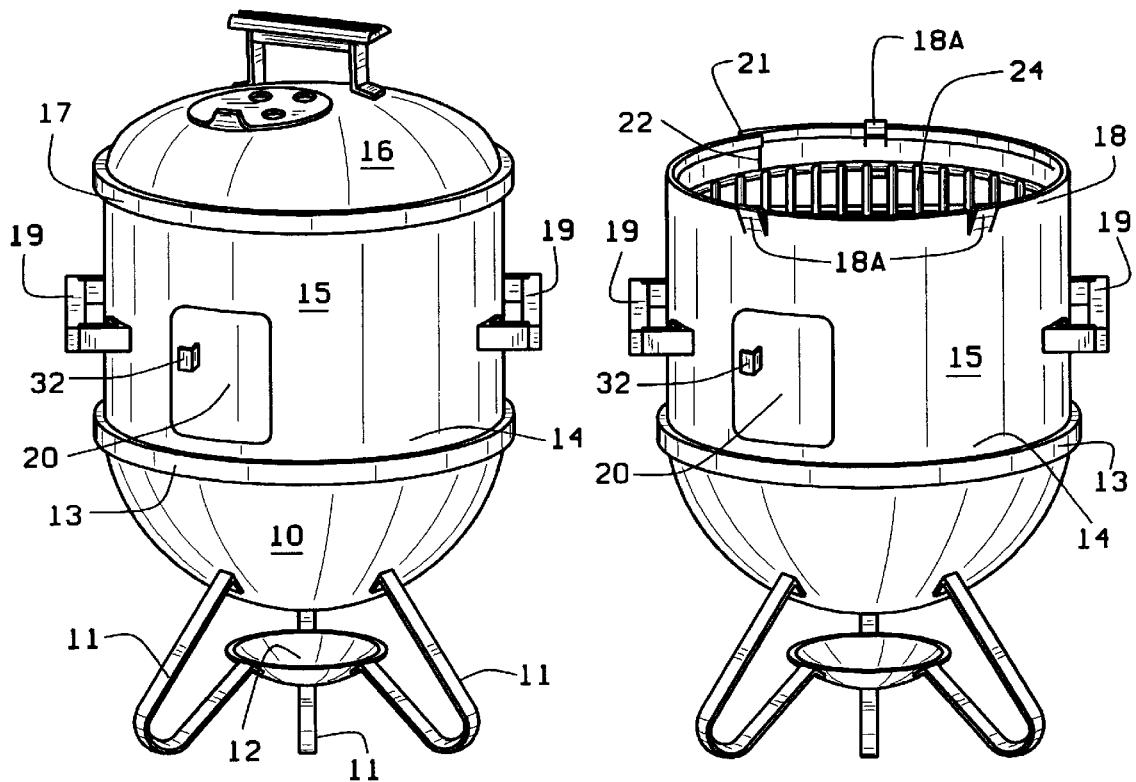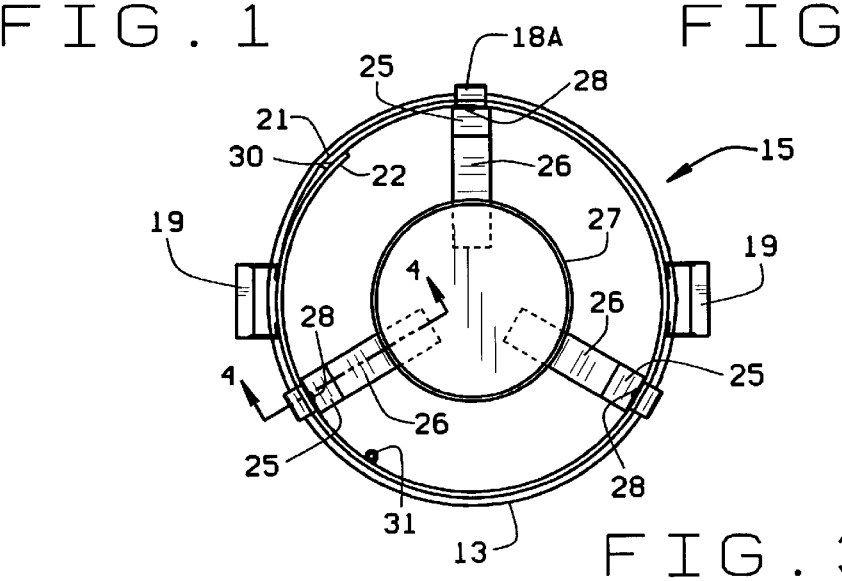

5,909,729

SMOKER ADAPTER FOR BARBECUE GRILLS

CROSS-REFERENCE TO RELATED PATENTS OR APPLICATIONS

1. U.S. Pat. No. 5,564,330 Frank L. Nowicke Sr.
2. Ser. No. 08/695,423 filed Aug. 12, 1996 Frank L. Nowicke, Sr.
3. Ser. No. 08/800,794 filed Feb. 14, 1997 Frank L. Nowicke, Jr.

STATEMENT REGARDING FEDERALLY SPONSORED RESEARCH OR DEVELOPMENT

Not Applicable

BACKGROUND OF THE INVENTION

This invention is directed to certain improvements in smoker adapters for use with barbecue grills in which such grills are readily adapted to a condition for smoking the objects initially barbecued on a grill in the presence of a pan presenting water vapor and enhancing the flavor of the smoked objects.

The prior art is best known by the examples cited in the files of the cross reference information and particularly a method and apparatus for use in converting an enclosed food cooker to a food smoker disclosed in Stewart U.S. Pat. No. 4,140,049 of Feb. 20, 1979, or disclosed in Helfing U.S. Pat. No. 4,334,462 of Jun. 15, 1982, as well as disclosed by Mentzel U.S. Pat. No. 4,512,249 of Apr. 23, 1985 and Nowicke Sr. U.S. Pat. No. 5,564,330 of Oct. 15, 1996.

The Stewart patent shows a structure that restricts the capacity of the fuel as well as the carrier for smoking food. In Helfing the apparatus requires a separate base to control the supply of air for the fire which is a gaseous fuel in relation to the provision for a rock grate and at least two food grates are provided for selective use. The problem with Helfing is that volcanic rock is required as the source of heat for cooking.

The known apparatus for barbecuing as well as food smoking requires complicated structures that call for assembly problems which, in turn, call for non-removable components that make it difficult to maintain the desired state of cleanliness.

BRIEF SUMMARY OF THE INVENTION

An object of the invention is to overcome the problems of prior art apparatus with regard to being able to clean the components due to the cooking and smoking of food.

Another object is to provide an adapter for converting a barbecue grill into an easily assembled smoker for enhancing food flavor.

Still another object is to provide a source of humidity from a water pan supported beneath the grill for retaining food in the path of the smoke.

A further object is to construct a smoker adapted for a barbecue grill that provides a simple and easy access to either the fire for producing the desired smoke or the pan containing water.

Other objects and advantages will be referred to in the following details of the improvements disclosed in a preferred embodiment disclosed in drawings as follows.

BRIEF DESCRIPTION OF THE SEVERAL VIEWS OF THE DRAWINGS

In the drawings, FIG. 1 is a perspective view in elevation of a barbecue grill converted into a food smoker;;

FIG. 2 is a perspective view of the food smoker adapted for a barbecue grill with the cover removed to reveal internal details;

FIG. 3 is a plan view of the barbecue smoker adapter looking into the open top of the adapter of FIG. 2;

Corresponding reference numerals will be used throughout the several figures of the drawings.

DETAILED DESCRIPTION OF THE INVENTION

Figure 4:
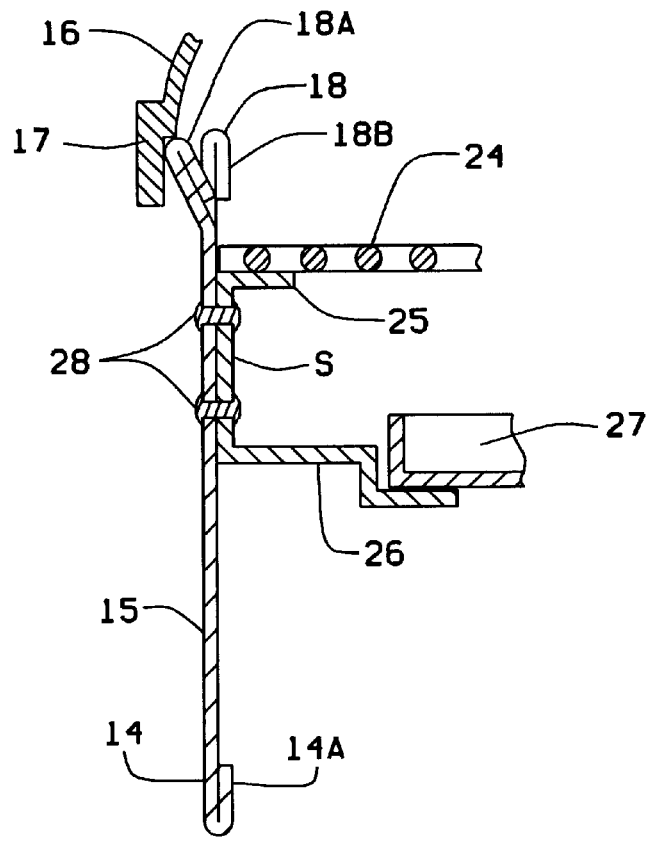
FIG. 4 is a vertical sectional view of a fragmentary side wall of the sleeve of the barbecue grill and smoker adapter seen in FIG. 1.

The following detailed description illustrates the invention by way of example and not by way of limitation. This description will clearly enable one skilled in the art to make and use the invention, and describes variations, presently believe to illustrate a mode of carrying out the invention.

The smoker adapter for a barbecue grill is seen in FIG. 1 to comprise a fuel combustion base 10 having three supporting legs 11 and an ash receiver 12. The base 10 provides a rim 13 forming a circumferential seat to receive the bottom end 14 of a cylindrical sleeve 15 which supports a cover 16 formed with a circumferential rim 17 that is supported over the upper end 18 of the sleeve 15. The sleeve 15 is provided with suitable handles 19 formed of wood or other material that does not readily pick up heat. Sleeve 15 also is provided with a door 20 which affords easy access to the interior of the sleeve 15 for a purpose to be explained.

FIG. 2 is a view similar to FIG. I but with the cover 16 removed to disclose that the sleeve 15 is formed from a sheet of material having edges 21 and 22 in lapped relation to complete the closure of a sleeve. These lapped edges are spot welded. The sheet material may be formed into its cylindrical shape from steel or steel with an aluminized coating or any other suitable material having a minimum thickness to conserve on weight. Furthermore the upper end 18 of the sleeve has been formed with tabs 1 8A bent outwardly and spaced around to provide support and centering for the rim 17 of cover 16. In placing the cover 16 down over the supports 18A the inside surface of the cover rim 17 assumes a close fit with the sleeve end 18 so that very little smoke escapes. With the cover 16 properly in place, it is evident that the food to be smoked will rest upon a grill 24 that fits down inside the sleeve 15 and rests upon supports 25. The cover 16 is supported by inwardly bent tabs 18A. The element S provides a support 26 formed to present a seat for a water pan 27. The supports S are spaced around the inside of the sleeve 15 and are attached by securing means such as for example as elements 28 which are rivets, but can be bolts for disassembly.

In FIGS. 2 and 3 it can be seen that the sleeve 15 when rolled into its cylindrical shape has a lapped fit at its ends 21 and 22 secured by spot welds 30 to each other. When the food supporting grill 24 of FIG. 2 is removed, there is shown in FIG. 3 the water pan 27 carried on the supports 26 that are attached (as in FIG. 4) by rivets and/or bolts 28 or other securing means adapted to engage in the sleeve 15 at a suitable elevation that is spaced below the position of the food grill 24. The position of the water pan 27 is selected so that it can be replenished when needed by access though the door 20 seen in FIGS. 1 and 2. The door is supported on a suitable hinge 31 that is attached to the inner surface, of the sleeve 15 and the door 20. However, the door 20 swings outward from its secured closed position by a suitable retainer operated by handle 32. When the door 20 is swung open it provides access to the fire supported in the base 10 on a grate structure (not shown), as well as access to the pan 27.

The fragmentary vertical view of FIG. 4 is a typical detail of the sleeve 15 and its interior supports in which the top edge 18 has been folded inwardly and flattened at 14A to reduce that edge so it cannot inflict cuts on the person handling the sleeve. In a similar manner the bottom edge 14 has also been turned and flattened inwardly at 14A to reduce the chance of developing a cutting edge. The typical tab 18A is formed by being bent outwardly to be engaged by the flange 17 of the cover 16. Interior support means in the form of strip material S extends into the sleeve to present an inturned support 25 to be engaged by the food supporting grill 24, and a support S having a radial extention 26 for the water pan 27. That strip can have a suitable length so the supports 25 and 26 can be separated properly.

Figure 5:
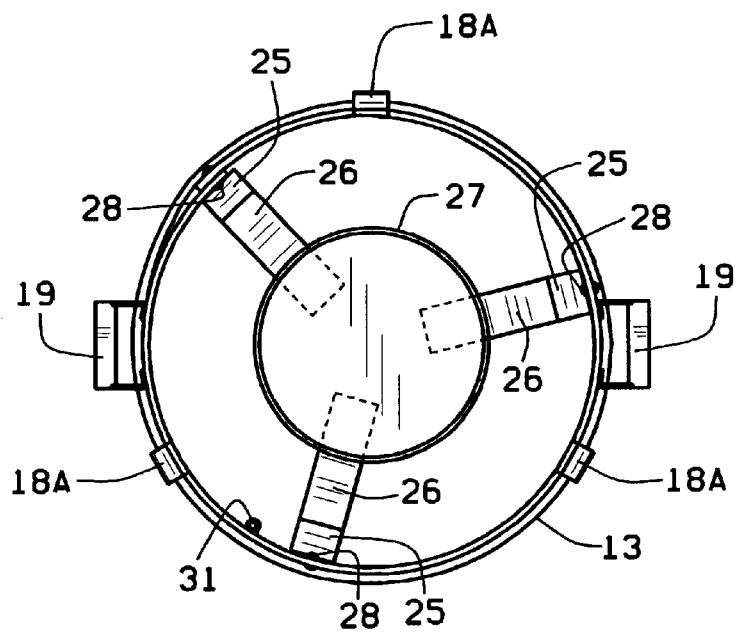
FIG. 5 is plan view similar to FIG. 3 which illustrates a modification differing from FIG. 3.

Turning now to FIG. 5 it can be seen that the support for the water pan 27 has been modified to have one of the vertical legs S riveted and/or bolted to the lapped ends 21 and 22 along the wall of the sleeve 15.

It may now be understood that the food smoker adapter for a barbecue grill is provided with a flat sheet of material which is formed into a vertical cylindrical sleeve 15 having a bottom end 14 and a top end 18. That material when formed into a cylindrical sleeve 15 has its edges 21 and 22 adjacent each other so that the ends can be spot welded at several places 30 which is difficult to show. As indicated in FIG. 5, instead of spot welding, the edges 21 and 22 can be secured together at the same time that one of the supports S is attached to the sleeve wall 15 by rivets and/or bolts 28.

The view of FIGS. 3 and 4 disclose that the food grill support 25 and the water pan support 26 are conveniently formed as a part of the support S. Thus, supports 25 and 27 are connected up in pairs to the support S, and by locating support S in spaced relation in the sleeve 15 those supports can establish a stable seat for the food grill 25 and the pan 27.

While a preferred embodiment of the invention and certain modifications thereof have been described and set forth in the description, it can be appreciated that the sleeve and the components designed to be used in combination therewith may be changed without departing from the scope of the invention, and it is intended that all matter combined in the foregoing description or shown in the accompanying drawings shall be interpreted as illustrating and not in a limiting sense.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

I claim:

1. A food smoker adapter for a barbecue grill fitted between a base and a cover, said adapter comprising:
   a) a cylindrical sleeve forming the adapter and shaped from a flat sheet to present a bottom open end for engaging the base, a top open end presented to receive the cover, said flat sheet having side edges extending vertically between said open bottom and top ends of the resulting cylindrical sleeve, and said bottom and top ends being formed with folded edges;
   b) a plurality of separate support means carried by said cylindrical sleeve and spaced around the internal surface thereof, each of said support means including a first support spaced from said top end and a second support spaced from said first support;
   c) a food supporting grill to be received on said first support, and a water pan to be received on said second support; and
   d) a plurality of tab elements formed in said top end folded edges and projecting outwardly from said cylindrical sleeve to present a support for the cover placed directly on said cylindrical sleeve tabs.

* * * * *